(12) United States Patent
Itoh

(10) Patent No.: US 10,069,435 B2
(45) Date of Patent: Sep. 4, 2018

(54) POWER SUPPLY APPARATUS AND IMAGE FORMING APPARATUS

(71) Applicant: CANON KABUSHIKI KAISHA, Tokyo (JP)

(72) Inventor: Masatoshi Itoh, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/845,255

(22) Filed: Dec. 18, 2017

(65) Prior Publication Data

US 2018/0196380 A1    Jul. 12, 2018

(30) Foreign Application Priority Data

Jan. 6, 2017    (JP) .................................. 2017-001336

(51) Int. Cl.
*H02M 7/04* (2006.01)
*G03G 15/00* (2006.01)

(52) U.S. Cl.
CPC .............. *H02M 7/04* (2013.01); *G03G 15/80* (2013.01)

(58) Field of Classification Search
CPC ...... G03G 15/80; G03G 15/2039; H07M 7/04
See application file for complete search history.

(56) References Cited

U.S. PATENT DOCUMENTS

| 8,761,631 | B2 * | 6/2014 | Shimura | ................ G03G 15/80 |
| | | | | 399/67 |
| 9,823,617 | B2 | 11/2017 | Shimura et al. | |
| 2009/0154942 | A1 * | 6/2009 | Hotogi | ............... G03G 15/0851 |
| | | | | 399/27 |

FOREIGN PATENT DOCUMENTS

JP    2007-212503 A    8/2007

OTHER PUBLICATIONS

U.S. Appl. No. 15/815,152, filed Nov. 16, 2017. Applicant: Yusuke Isomi, et al.

* cited by examiner

*Primary Examiner* — Kyle J Moody
(74) *Attorney, Agent, or Firm* — Fitzpatrick, Cella, Harper & Scinto

(57) ABSTRACT

The power supply apparatus configured to supply power to a load includes a control unit that corrects a power amount calculated by a power calculation unit based on a first voltage of an AC power supply calculated by a voltage calculation unit when the power amount is calculated, and a second voltage of the AC power supply calculated by the voltage calculation unit when a switching unit is controlled to start power supply to a power supply and a first transformer from the AC power supply.

17 Claims, 11 Drawing Sheets

FIG. 6

| INPUT VOLTAGE | VOLTAGE BETWEEN B-B' | CURRENT VALUE OF FIXING DEVICE | ACTUAL EFFECTIVE POWER VALUE OF FIXING DEVICE | EFFECTIVE POWER VALUE BY POWER CALCULATION UNIT | DETECTION ERROR |
|---|---|---|---|---|---|
| 110V | 105V | 12A | 1320W | 1260W | -60W |
| 110V | 105V | 10A | 1100W | 1050W | -50W |
| 110V | 105V | 8A | 880W | 840W | -40W |
| 110V | 105V | 6A | 660W | 630W | -30W |

| FIG. 7A |
| FIG. 7B |

POWER SUPPLY APPARATUS AND IMAGE FORMING APPARATUS

BACKGROUND OF THE INVENTION

Field of the Invention

The present invention relates to a power supply apparatus and an image forming apparatus which are suitable for control of a heat fixing device mounted in an image forming apparatus such as an electrophotographic type of a copier or a printer.

Description of the Related Art

An image forming apparatus, such as an electrophotographic copier or a printer, includes a heat fixing device that heats and pressurizes an unfixed toner image on a recording material to fix the unfixed toner image onto the recording material. In a power supply apparatus that controls power supply to a heat fixing device, a method for controlling an AC voltage to be supplied from an AC power supply by using a bidirectional thyristor (hereinafter referred to as a triac) or the like is widely employed. As for the power supply apparatus described above, Japanese Patent Application Laid-Open No. 2007-212503 proposes a technique for detecting power to be supplied to a heat fixing device by detecting an effective value of a current flowing to the heat fixing device.

In recent years, a time (First Print Out Time, hereinafter referred to as FPOT) required from a time when starting of a print operation is instructed until a first recording material is discharged has been shortened. For example, as for the heat fixing device, an image forming operation is started at a timing when a temperature appropriate for image formation is reached immediately before a recording material reaches the heat fixing device, instead of starting the image forming operation after detecting that a heater temperature has increased to a temperature for image formation. Thus, FPOT can be shortened.

Also the power supply apparatus is required to accurately control power supply to the heat fixing device so as to shorten FPOT. Accordingly, the power supply apparatus is required to accurately detect power to be supplied to the heat fixing device.

SUMMARY OF THE INVENTION

The present invention has been made in view of the above-described circumstances, and enables accurate detection of power to be supplied to a heat fixing device.

An aspect of the present invention is a power supply apparatus configured to supply power to a load, including a first line and a second line each of which receives an AC voltage from an AC power supply; a conversion element configured to convert the AC voltage input to each of the first line and the second line into a current according to the AC voltage; a voltage detection device including a first transformer including a primary winding and a secondary winding, the voltage detection device configured to detect an AC voltage based on a signal indicating the AC voltage output from the secondary winding of the first transformer by supplying the current converted by the conversion element to the primary winding; a current detection unit including a second transformer having a primary winding and a secondary winding, the current detection unit configured to detect a current value of a current supplied to a first load included in the load based on a signal indicating an AC voltage output to a secondary side of the second transformer according to the current by supplying the current to the primary winding; a zero-crossing detection unit configured to detect a zero-crossing timing of the AC power supply based on a signal indicating the AC voltage detected by the voltage detection device; a voltage calculation unit configured to calculate a voltage of the AC power supply based on the signal indicating the AC voltage detected by the voltage detection device and the zero-crossing timing of the AC power supply detected by the zero-crossing detection unit; a power calculation unit configured to calculate an amount of power to be supplied to the first load from the AC power supply based on a value of a current to be supplied to the first load detected based on the signal indicating the AC voltage output from the current detection unit, and a voltage value of the AC voltage calculated by the voltage calculation unit; a switching unit configured to connect or disconnect a current path from the AC power supply to the primary winding of the first transformer and a power supply configured to output a predetermined DC voltage to a second load included in the load; and a control unit configured to control the switching unit and control power supply to the first load and the second load, wherein the control unit corrects the amount of power calculated by the power calculation unit based on a first voltage of the AC power supply calculated by the voltage calculation unit when the amount of power is calculated, and a second voltage of the AC power supply calculated by the voltage calculation unit when the switching unit is controlled to start power supply to the power supply and the first transformer from the AC power supply.

Another aspect of the present invention is an image forming apparatus including an image forming unit configured to form an image on a recording material, a fixing unit including a heating resistor member, the fixing unit configured to fix an unfixed toner image formed on the recording material onto the recording material, a power supply unit configured to supply power to the fixing unit, wherein the power supply unit includes a first line and a second line each receiving an AC voltage from an AC power supply, a conversion element configured to convert the AC voltage input to each of the first line and the second line into a current according to the AC voltage, a voltage detection device including a first transformer including a primary winding and a secondary winding, the voltage detection device configured to detect an AC voltage based on a signal indicating the AC voltage output from the secondary winding of the first transformer by supplying the current converted by the conversion element to the primary winding, a current detection unit including a second transformer including a primary winding and a secondary winding, the current detection unit configured to detect a current value of a current supplied to a first load included in the load based on a signal indicating an AC voltage output to a secondary side of the second transformer according to the current by supplying the current to the primary winding, a zero-crossing detection unit configured to detect a zero-crossing timing of the AC power supply based on a signal indicating the AC voltage detected by the voltage detection device, a voltage calculation unit configured to calculate a voltage of the AC power supply based on the signal indicating the AC voltage detected by the voltage detection device and the zero-crossing timing of the AC power supply detected by the zero-crossing detection unit, a power calculation unit configured to calculate an amount of power to be supplied to the first load from the AC power supply based on a value of a current to be supplied to the first load detected based on the signal indicating the AC voltage output from the current detection unit, and a voltage value of the AC voltage calculated by the voltage calculation unit, a switching unit configured to connect or disconnect a current path from the AC power supply to the primary winding of the first transformer and a power supply configured to output a predetermined DC voltage to a second load included in the load, and a control unit configured to control the switching unit and control power supply to the first load and the second load, and wherein the control unit corrects the amount of power calculated by the power calculation unit based on a first voltage of the AC power supply calculated by the voltage calculation unit when the amount of power is calculated, and a second voltage of the AC power supply calculated by the voltage calculation unit when the switching unit is controlled to start power supply to the power supply and the first transformer from the AC power supply.

Further features of the present invention will become apparent from the following description of exemplary embodiments with reference to the attached drawings.

BRIEF DESCRIPTION OF THE DRAWINGS

FIG. 6 is a table illustrating an error in the effective power value in a power calculation unit according to the first exemplary embodiment.

DESCRIPTION OF THE EMBODIMENTS

Preferred embodiments of the present invention will now be described in detail in accordance with the accompanying drawings.

[Configuration of Image Forming Apparatus]

Figure 1:
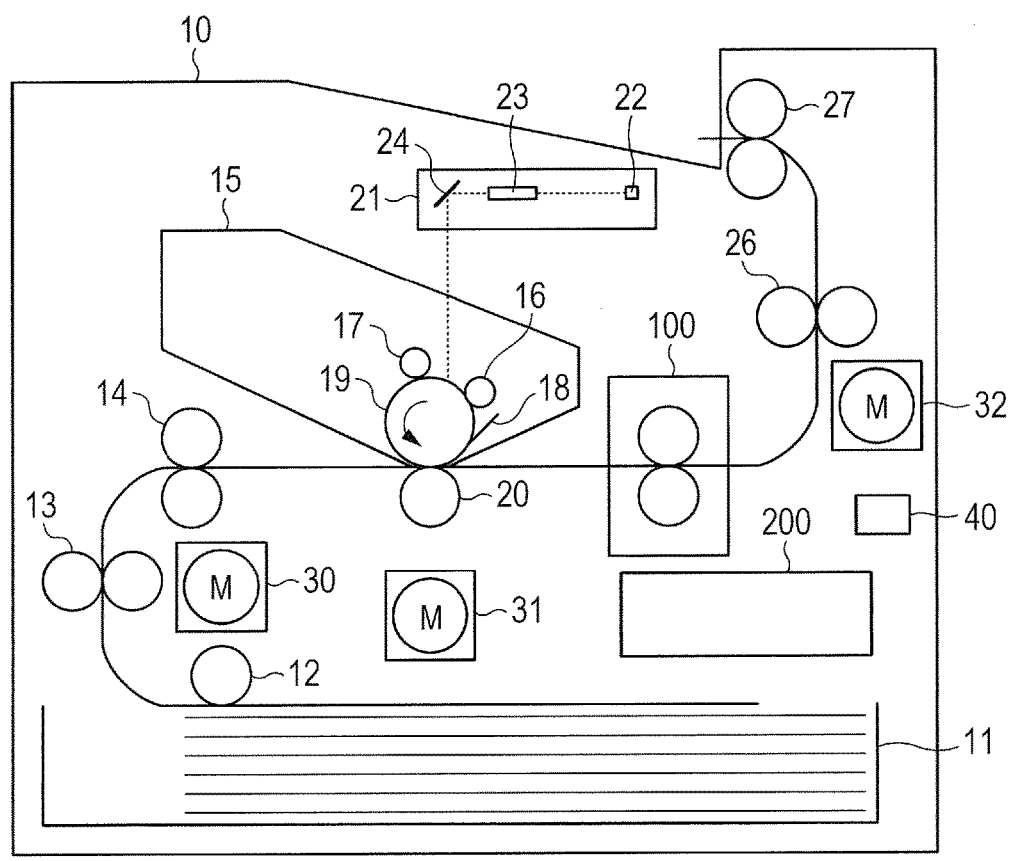
FIG. 1 is a sectional view illustrating a configuration of an image forming apparatus according to first and second exemplary embodiments.

FIG. 1 is a sectional view illustrating a schematic configuration of a black-and-white printer that performs image formation using black toner, as an example of an electrophotographic image forming apparatus 10. Referring to FIG. 1, a sheet of recording paper which is a recording material stacked on a sheet supplying cassette 11 is fed from the sheet supplying cassette 11 by the pickup roller 12 and is conveyed to a registration roller 14 by a sheet feeding roller 13. The recording paper conveyed to the registration roller 14 is further conveyed to a process cartridge 15 at a predetermined timing. The process cartridge 15 serving as an image forming unit is integrally formed with a charging device 16, a development roller 17 serving as a development unit, a cleaner 18 serving as a cleaning unit, and a photoconductive drum 19 serving as a photosensitive member that rotates in a direction (counterclockwise) indicated by an arrow in the figure. An unfixed toner image is transferred onto the conveyed recording paper by a series of known electrophotographic process processing as described below. The surface of the photoconductive drum 19 is uniformly charged by the charging device 16, and then exposure is performed based on an image signal by a scanner unit 21 serving as an exposure unit. A laser beam output from a laser diode 22 in the scanner unit is deflected by a rotary polygon mirror 23, and an electrostatic latent image is formed on the photoconductive drum 19 by scanning the photoconductive drum 19 through a reflective mirror 24. Toner is caused to adhere to the electrostatic latent image, which is formed on the photoconductive drum 19, by the development roller 17, to thereby visualize a toner image. The toner image formed on the photoconductive drum 19 is transferred onto the recording paper, which is conveyed from the registration roller 14, by a transfer roller 20. The recording paper onto which the toner image is transferred is conveyed by a heat fixing device 100 (hereinafter referred to as the fixing device 100), the unfixed toner image formed on the recording paper (on the recording material) is heated and pressurized by the fixing device 100, thereby fixing the toner image onto the recording paper. Then, the recording paper is discharged to the outside of the image forming apparatus 10 by an intermediate discharge roller 26 and a discharge roller 27, and a series of print operations is terminated.

A sheet conveyance roller 30 (represented by M in the figure) drives the sheet feeding roller 13, the registration roller 14, and the like. A drum motor 31 (represented by M in the figure) drives rollers constituting a drive system in the process cartridge 15 including the photoconductive drum 19. A fixing motor 32 (represented by M in the figure) drives rollers, such as a pressure roller, of the fixing device 100. A power supply apparatus 200 is a power supply apparatus used in the image forming apparatus 10, and is connected to an AC power supply 201 (see FIG. 2), which is a commercial power supply, through a power supply cable which is not illustrated. The image forming apparatus to which the power supply apparatus 200 can be applied is not limited to the image forming apparatus illustrated in FIG. 1. For example, an image forming apparatus such as a color printer including a plurality of image forming units may be applied. An image forming apparatus including a primary transfer unit that transfers a toner image formed on the photoconductive drum 19 onto an intermediate transfer belt, and a secondary transfer unit that transfers the toner image formed on the intermediate transfer belt onto recording paper may also be applied.

A controller 40 controls the image forming operation of the image forming apparatus 10 according to an image formation start instruction from an operation unit (not illustrated) or an external computer. The power supply apparatus 200 controls a duty of a switching element, such as a triac, by a control method, such as a phase control or a wave number control, and also controls power to be supplied to the fixing device 100. In the present exemplary embodiment, a triac is used as a switching element, but instead, for example, a switching circuit, such as an inverter, may be used to control power to be supplied to the fixing device 100.

[Configuration of Power Supply Apparatus]

Figure 2:
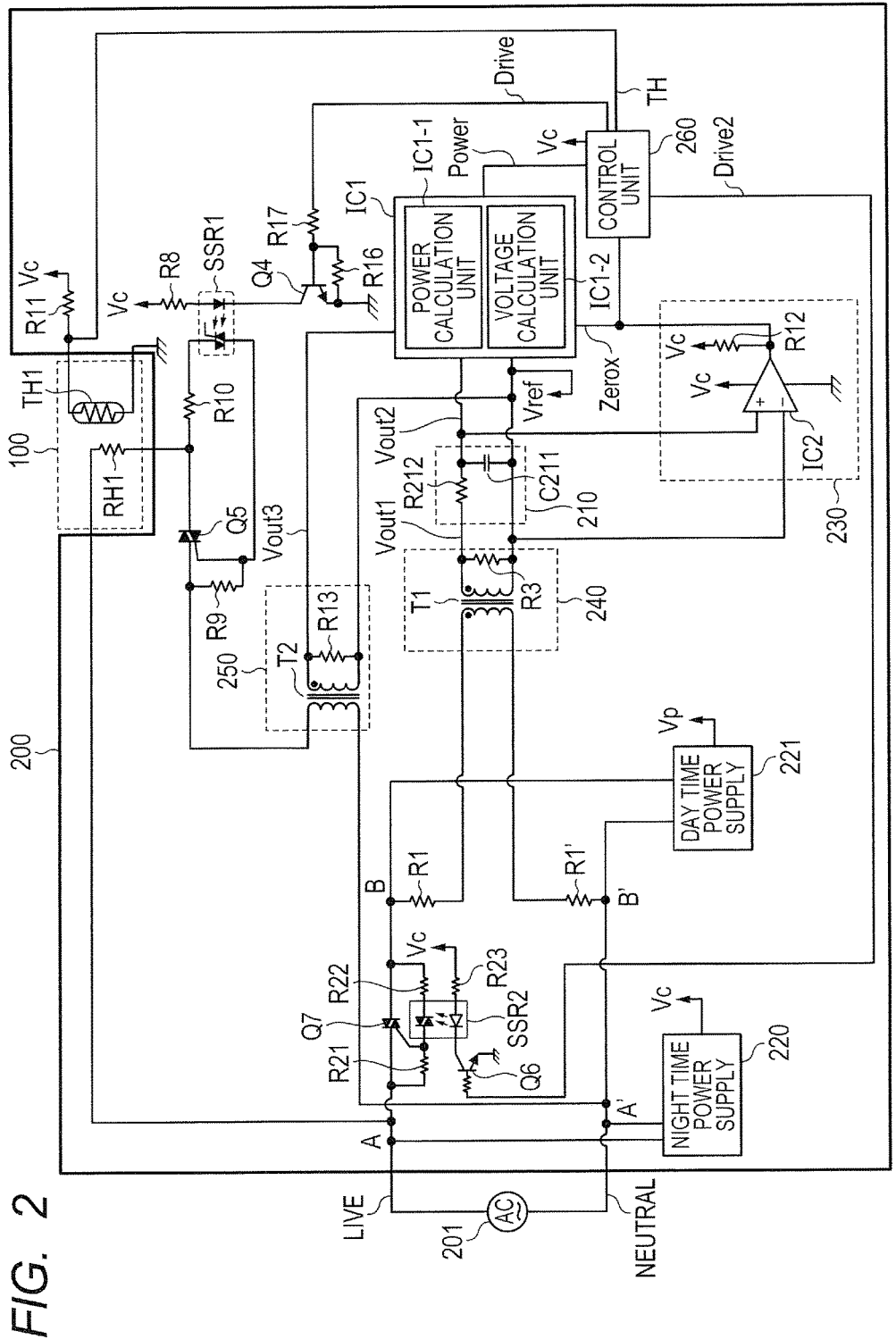
FIG. 2 is a diagram illustrating a circuit configuration of a power supply apparatus according to the first and second exemplary embodiments.

FIG. 2 is a diagram illustrating a circuit configuration of the power supply apparatus 200 according to the present exemplary embodiment. The AC power supply 201 (represented by "AC" in the figure) outputs an AC voltage between a live-side line (represented by "LIVE" in the figure) which is a first line or a second line, and a neutral-side line (represented by "NEUTRAL" in the figure) which is the second line or the first line.

(Night Time Power Supply)

A night time power supply 220 receives an AC voltage from the live-side line and the neutral-side line of the AC power supply 201, and outputs a predetermined voltage Vc to a secondary-side load insulated from the primary-side AC power supply 201. The predetermined voltage Vc is supplied to a control unit 260, which is a control unit to be described below, and the like. The night time power supply 220 is a power supply that continuously outputs a predetermined DC voltage Vc as long as the AC voltage is received from the AC power supply 201. In the present exemplary embodiment, an output voltage Vc of the night time power supply 220 is supplied to a control unit 260 and the like. The circuit configuration is not limited to this. For example, the output voltage Vc may be converted into a different voltage to be supplied to the control unit 260 and the like. While FIG. 2 illustrates a configuration in which the night time power supply 220 is incorporated in the power supply apparatus 200, for example, an external power supply to be supplied with power from the power supply apparatus 200 may be used.

(Switching Unit)

Next, a switching unit that supplies power to a voltage detection device 240, which is a voltage detection unit, and a day time power supply 221, or interrupts the power supply, by connecting or disconnecting a current supply path from the AC power supply 201 will be described. The switching unit that controls power supply to the voltage detection device 240 and the day time power supply 221 includes a phototriac coupler SSR2, a transistor Q6, a triac Q7, and resistors R21, R22, and R23. The resistors R21 and R22 are resistors for driving the triac Q7, and the phototriac coupler SSR2 is a device for ensuring a creepage distance between a primary side and a secondary side. A current flows to a secondary side light-emitting diode of the phototriac coupler SSR2 to bring the light-emitting diode into a conductive state, thereby bringing the primary-side triac Q7 of the phototriac coupler SSR2 into the conductive state. Once the triac Q7 is brought into the conductive state, the ON state is held until a zero-crossing point of the AC voltage of the AC power supply 201 is arc-extinguished.

During operation of the image forming apparatus 10, when the control unit 260 sets a Drive2 signal to a high level, the transistor Q6 turns on and a current flows to the secondary side light-emitting diode of the phototriac coupler SSR2 through the resistor R23, thereby bringing the light-emitting diode into the conductive state. As a result, the triac Q7 turns on and the current from the AC power supply 201 flows to each of the voltage detection device 240 and the day time power supply 221, thereby supplying the current. When the image forming apparatus 10 operates in a power saving state such as the sleep mode, the control unit 260 sets the Drive2 signal to a low level. Accordingly, the transistor Q6 turns off and no current flows to the secondary side light-emitting diode of the phototriac coupler SSR2, thereby bringing the light-emitting diode into a non-conductive state. As a result, the triac Q7 turns off and the power supply from the AC power supply 201 to each of the voltage detection device 240 and the day time power supply 221 is interrupted. In this manner, the arrangement of the voltage detection device 240 and the day time power supply 221 at a subsequent stage of the triac Q7 enables a reduction in power consumption in the voltage detection device 240 and the day time power supply 221 during the sleep mode or power-off of the image forming apparatus 10.

(Day Time Power Supply)

The day time power supply 221 is a power supply that receives the AC voltage from the live-side line and the neutral-side line of the AC power supply 201, and outputs a predetermined DC voltage Vp to a secondary-side load insulated from the primary-side AC power supply 201. The predetermined voltage Vp is supplied to the sheet conveyance roller 30, the drum motor 31, the fixing motor 32, and the like. FIG. 2 illustrates a configuration in which the day time power supply 221 is incorporated in the power supply apparatus 200. However, for example, an external power supply to be supplied with power form the power supply apparatus 200 through the triac Q7 may also be used.

(Voltage Detection Device)

Resistors R1 and R1' each serve as a voltage detection resistor used to detect an input voltage of the AC power supply 201, and also serve as a conversion element for converting the AC voltage of the AC power supply 201 into a current proportional to the AC voltage. Specifically, a current proportional to the resistor value (predetermined fixed value) of each of the resistors R1 and R1' and the AV voltage value of the AC power supply 201 flows to the primary side of a transformer T1 which is a current transformer.

The voltage detection device 240 serving as a voltage detection unit that detects the AC voltage of the AC power supply 201, includes the transformer T1 serving as a first transformer and a damping resistor R3. One end of the resistor R1 is connected to the live-side line and the other end of the transistor R1 is connected to one end of a primary winding of the transformer T1. On the other hand, one end of the resistor R1' is connected to the neutral-side line and the other end of R1' is connected to an end of the primary winding (the other end of the primary winding) opposite to the end of the primary winding connected to the resistor R1. A current proportional to the input voltage (AC voltage) of the AC power supply 201 that is applied between the live-side line and the neutral-side line by the resistors R1 and R1' each having the predetermined resistor value flows to the primary winding side of the transformer T1. Further, since the current proportional to the primary-side current flows to the secondary winding side of the transformer T1, an output voltage Vout1 generated in the damping resistor R3 is a voltage proportional to the input voltage of the AC power supply 201, so that the input voltage of the AC power supply 201 can be detected.

(Phase Adjustment Unit)

A phase adjustment unit 210 that adjusts the phase of the output voltage Vout1 of the transformer T1 includes a resistor R212 and a capacitor C211. In the waveform of the output voltage of the transformer T1, a phase lead amount ΔT1 (see FIGS. 3A to 3E) is generated for the waveform of the AC voltage of the AC power supply 201. Accordingly, the phase adjustment unit 210 performs the phase adjustment so that a phase difference between an output voltage Vout3 of a transformer T2, which is described below, and the AC voltage is reduced by the resistor R212 and the capacitor C211, and outputs a voltage Vout2. The voltage Vout2 is input to a calculation unit IC1 that calculates a voltage and power. The phase adjustment unit 210 is not indispensable. When the phase adjustment unit 210 is not present, the output voltage of the transformer T1 may be set to be input to the calculation unit IC1 for a predetermined period (a period longer than the phase lead amount ΔT1) to detect an appropriate input voltage.

(Voltage Calculation Unit)

The calculation unit IC1 includes a voltage calculation unit IC1-2 (hereinafter referred to as a voltage calculation unit 2) that calculates a voltage, and a power calculation unit IC1-1 (hereinafter referred to as a power calculation unit 1) which is described below. A voltage calculation unit 2 receives the voltage Vout2 output from the phase adjustment unit 210 and a predetermined reference voltage Vref. The voltage calculation unit 2 calculates a square value of a difference value between the voltage Vout2 and the reference voltage Vref, thereby calculating a square value of a voltage effective value of the AC power supply 201. The voltage calculation unit 2 may calculate a voltage effective value, a voltage average value, or the like of the AC power supply 201. Further, the voltage calculation unit 2 calculates the square value of the voltage effective value of the AC power supply 201 for a half cycle of the AC power supply 201 and for each integral multiple of the half cycle based on a Zerox signal (zero-crossing signal) which is described below. The voltage calculation unit 2 may calculate the square value of the voltage effective value of the AC power supply 201 for the predetermined period that is asynchronous with the Zerox signal which is described below.

(Current Detection Unit)

The power supply apparatus 200 includes a current detection unit 250 serving as a current detection unit including the transformer T2 and a damping resistor R13 to detect a value of a current supplied to the fixing device 100 (first load). One end of the primary winding of the transformer T2 is connected to a triac Q5, and the other end of the primary winding of the transformer T2 is connected to the neutral-side line. When the triac Q5 is in the conductive state, a current supplied to a heating resistor member RH1 (hereinafter referred to as the heating member RH1) of the fixing device 100 flows to the primary winding. At the secondary side of the transformer T2, a current proportional to the current flowing to the heating member RH1 of the fixing device 100 is generated. A voltage Vout3 that is generated in the damping resistor R13 by the current is a voltage proportional to the current flowing to the heating member RH1, which enables detection of the value of the current supplied to the fixing device 100. Further, the output voltage Vout3 and the predetermined reference voltage Vref are input to the calculation unit IC1.

(Power Calculation Unit)

A power calculation unit 1 multiplies the difference value between the voltage Vout3 and the reference voltage Vref by the difference value between the voltage Vout2 and the reference voltage Vref, to thereby calculate the effective power value supplied to the fixing device 100. The power calculation unit 1 calculates the effective power value supplied to the fixing device 100 for a half cycle of the AC power supply 201 and for each integral multiple of the half cycle based on the Zerox signal described below. The power calculation unit 1 may calculate the average power value input to the fixing device 100 for a predetermined period that is asynchronous with the Zerox signal described below. The calculation unit IC1 notifies the control unit 260 of information indicating the effective value voltage and the effective power value that are calculated by the voltage calculation unit 2 and the power calculation unit 1, respectively, by using a power signal.

[Power-on of Heating Resistor Member]

Next, a method for supplying power to the heating member RH1 serving as a heater unit of the fixing device 100 illustrated in FIG. 2 will be described. The control unit 260 controls the power supply to the heating member RH1 serving as the heater unit of the fixing device 100 by a drive signal. The control unit 260 sets the drive signal to a high level when power is supplied to the heating member RH1 serving as a load, and the control unit 260 sets the drive signal to a low level when the power supply to the heating member RH1 is interrupted. A transistor Q4 is turned off when the drive signal from the control unit 260 is at the high level, and the transistor Q4 is turned off when the drive signal is at the low level. Resistors R17 and R16 are resistors for driving the transistor Q4.

A secondary side light-emitting diode of a phototriac coupler SSR1 (hereinafter referred to as the triac coupler SSR1) which is a device for ensuring a creepage distance between a primary side and a secondary side is turned on or off by the transistor Q4. Specifically, when the transistor Q4 turns on, the secondary side light-emitting diode of the triac coupler SSR1 is brought into the conductive state, and a current from the voltage Vc flows through a pull-up resistor R8, thereby emitting light. This brings the primary-side triac of the triac coupler SSR1 into the conductive state, and the triac Q5 is brought into the conductive state. As a result, a current path (power supply path) connecting the live-side line, the heating member RH1, the triac Q5, and the neutral-side line is formed. The triac Q5 holds the ON state until the zero-crossing timing of the input voltage of the AC power supply 201 is reached. Resistors R9 and R10 disposed between the triac Q5 and the primary-side triac of the triac coupler SSR1 are resistors for driving the triac Q5. On the other hand, when the transistor Q4 is turned off, the secondary side light-emitting diode of the triac coupler SSR1 is brought into the non-conductive state and the primary-side triac is also brought into the non-conductive state. Thus, the triac Q5 is also brought into the non-conductive state and the power supply from the AC power supply 201 to the heating member RH1 is interrupted.

The temperature of the heating member RH1 of the fixing device 100 is detected by a thermistor TH1 serving as a temperature detection unit. A voltage obtained by dividing the voltage Vc by the resistor value of the thermistor TH1 and the resistor value of the resistor R11 that vary depending on the temperature of the heating member RH1 is input to the control unit 260 as a TH signal. The control unit 260 calculates a power duty to be supplied to the heating member RH1 by, for example, PID control, based on the temperature of the heating member RH1 detected by the thermistor TH1 and a set target temperature of the heating member RH1. Further, the control unit 260 converts the calculated power duty into a control level, such as the corresponding phase angle (in the case of phase control), or wave number (in the case of wave number control), and controls the ON/OFF state of the transistor Q4 by the drive signal based on the converted control condition. Thus, the triac Q5 is controlled to control the power supply to the heating member RH1.

(Zero-Crossing Detection Unit)

Next, a method for detecting zero-crossing of the AC power supply 201 will be described. In the present exemplary embodiment, FIG. 2 illustrates a configuration in which the zero-crossing detection unit 230 serving as a zero-crossing detection unit includes a comparator IC2 and a resistor R12. A non-inverting terminal (+) of the comparator IC2 receives the output voltage Vout2 of the transformer T1, and an inverting terminal (−) of the comparator IC2 receives the reference voltage Vref of the transformer T1. The comparator IC2 outputs the Zerox signal (zero-crossing signal), which indicates a comparison result of a comparison between input voltages of two terminals, to the calculation unit IC1 and the control unit 260. Thus, the control unit 260 can detect the zero-crossing timing of the AC power supply 201. Zero-crossing is detected base on a signal having an AC voltage waveform of the output voltage Vout2 of the phase adjustment unit 210. The phase adjustment unit 210 may be omitted. When the phase adjustment unit 210 is not present, the zero-crossing timing based on the output voltage of the transformer T1 may be corrected by the phase lead amount ΔT1. In this case, the phase lead amount is preliminarily stored in the calculation unit IC1 as a fixed value.

(Control Unit)

The control unit 260 controls the power supply to the heating member RH1 serving as the heater unit of the fixing device 100 by the drive signal. Further, the control unit 260 supplies power from the AC power supply 201 to the voltage detection device 240 and the day time power supply 221, or interrupts the power supply, by the Drive2 signal. Further, the control unit 260 obtains information about the square value or effective power value of the effective value voltage for each half cycle of the AC voltage supplied from the AC power supply 201 for each half wave (for each half cycle) in synchronization with the Zerox signal described below. The control unit 260 obtains the average value of effective value voltages or effective power values of a plurality of obtained half waves, and calculates the voltage effective value of the AC power supply 201 and the effective power value supplied to the fixing device 100. The calculated values are used to control the fixing device 100. The calculation methods in the voltage calculation unit 2, the power calculation unit 1, and the control unit 260, and which one of the calculation methods is used by which units are not limited to the methods described in the present exemplary embodiment. FIG. 2 illustrates that the control unit 260 is the control unit of the power supply apparatus 200, but instead, for example, the controller 40 of the image forming apparatus 10 described above may be used. In this case, the controller 40 functions as a control unit.

As described above, the power supply apparatus 200 detects a power amount and thus can directly detect the amount of power supplied to the heating member RH1 from the current value and voltage value to be supplied to the fixing device 100. Thus, the amount of power to be supplied to the fixing device 100 can be accurately detected without any adverse effect of an error in the power duty by the control method (wave number control, phase control), or a variation in the heating member RH1 of the fixing device 100. Even when the resistor temperature coefficient of the heating member RH1 (the resistance value varies when the temperature of the heating member rises) is high, the amount of power supplied to the fixing device 100 can be accurately detected. The power supply apparatus 200 can directly detect the amount of supplied power. Accordingly, even when the power supply apparatus 200 supplies power to a load other than a resistor, such as a switching circuit, such as an inverter, a capacitive load, or an inductor, and the supplied power can be used for detection.

[Voltage Waveform, Power Waveform, Zerox Signal Waveform]

Figure 3A:
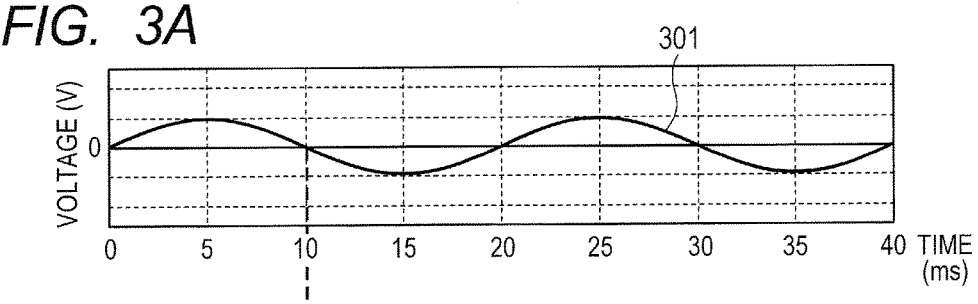
FIGS. 3A, 3B, 3C, 3D and 3E are graphs each illustrating a waveform of a voltage, current, and power of each unit of the power supply apparatus according to the first and second exemplary embodiments.
Figure 3B:
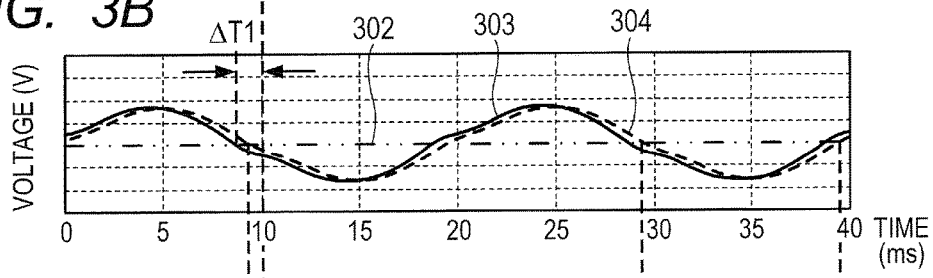
Figure 3C:
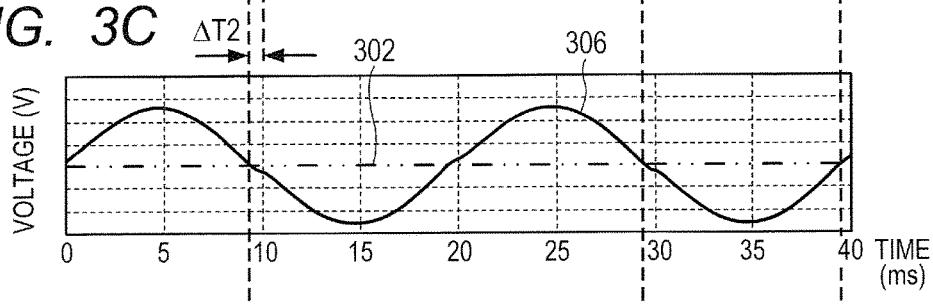
Figure 3D:
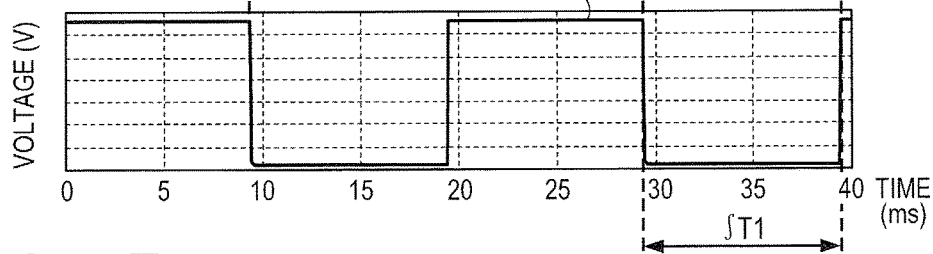
Figure 3E:
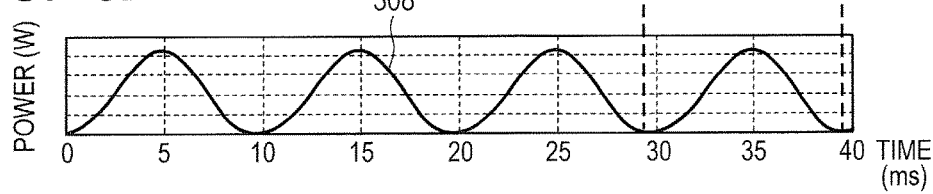

FIGS. 3A to 3E are graphs illustrating voltage waveforms of the AC voltage of the AC power supply 201, the output voltage Vout1 of the transformer T1, the output voltage Vout2 of the phase adjustment unit 210, and the output voltage Vout3 of the transformer T2 in the present exemplary embodiment. FIG. 3E also illustrates a voltage waveform of a waveform 308 obtained by multiplying the waveform of the Zerox signal, which is output from the comparator IC2, and the waveform of the output voltages Vout2 and Vout3. The present exemplary embodiment is described assuming that the waveform 308 is the power waveform of the heating member RH1 (waveform indicating a value obtained by multiplying the difference value between the output voltage Vout3 and the reference voltage Vref and the difference value between the output voltage Vout2 and the reference voltage Vref).

FIG. 3A is a graph illustrating a waveform 301 of the input voltage of the AC power supply 201. In FIG. 3A, the horizontal axis represents time (in units of ms (milliseconds)), and the vertical axis represents a voltage (in units of V (volts)). The vertical axis and the horizontal axis in FIGS. 3B to 3D are similar to those in FIG. 3A, and thus the descriptions thereof will be omitted. The waveform 301 indicates an input voltage waveform (100 Vrms, 50 Hz) of the AC power supply 201, one cycle of the waveform is 20 ms. In FIG. 3A, timings when the voltage of the AC power supply 201 becomes 0 volts, i.e., 10 ms, 20 ms, 30 ms, and 40 ms, correspond to the zero-crossing timing. FIG. 3B illustrates a voltage waveform 303 (solid line), which is a voltage waveform of the output voltage Vout1 of the transformer T1, a waveform 302 (alternate long and two short dashes line) of the reference voltage Vref of the transformer T1, and a voltage waveform 304 (broken line) of the output voltage Vout2 of the phase adjustment unit 210. FIG. 3C illustrates a voltage waveform 306 (solid line) of the output voltage Vout3 of the transformer T2, and the waveform 302 (alternate long and two short dashes line) of the reference voltage Vref of the transformer T2. In the voltage waveform 306 of the output voltage Vout3, a phase lead amount ΔT2 is generated for the waveform 301 of the AC power supply 201 due to the effect of the secondary-side inductance of the transformer T2.

FIG. 3E illustrates, as the waveform 308, the power calculated value obtained by multiplying the difference value between the output voltage Vout2 and the reference voltage Vref and the difference value between the output voltage Vout3 indicated by the voltage waveform 306 and the reference voltage Vref. In FIG. 3E, the horizontal axis represents time (in units of ms (milliseconds)), and the vertical axis represents power (in units of W (watt)). When the phase of the output voltage Vout2 and the phase of the output voltage Vout3 shift from each other, the power calculation accuracy of the power calculation unit 1 may deteriorate. As illustrated in FIG. 3B, in the voltage waveform 303 of the output voltage Vout1, the phase lead amount ΔT1 is generated for the waveform 301 of the AC power supply 201, and corresponds to a phase shift amount different from the phase lead amount ΔT2 of the voltage waveform 306 of the output voltage Vout3 (ΔT1>ΔT2). Accordingly, in order to improve the power calculation accuracy of the power calculation unit 1, the phase adjustment unit 210 performs the phase adjustment so as to reduce a phase shift between the output voltage Vout1 of the transformer T1 and the output voltage Vout3 of the transformer T2, i.e., (ΔT1−ΔT2).

FIG. 3D illustrates a voltage waveform 305 of the Zerox signal which is output from the comparator IC2. The Zerox signal is generated based on the output voltage Vout2 of the phase adjustment unit 210. As a result, the phase lead amount of the Zerox signal for the waveform 301 of the AC voltage of the AC power supply 201 matches the phase lead amount ΔT2 of the voltage waveform 304 of the output voltage Vout2 of the phase adjustment unit 210. Accordingly, an integral section ʃT1 (in this case, a negative half cycle of the AC power supply 201 is illustrated as an example) for calculating the power of the power calculation unit 1 is determined by using the voltage waveform 305 of the Zerox signal in which the same phase lead amount ΔT2 is generated. Thus, the power calculation unit 1 can calculate the amount of power to be supplied to the fixing device 100 for an appropriate period according to the phase lead amount ΔT2. When the average power to be supplied to the fixing device 100 for each integral multiple of the half cycle of the AC power supply 201, for example, not only for the half cycle (ʃT1) of the AC power supply 201, but also for a full cycle of the AC power supply 201, a method for setting an integral section for calculation using the voltage waveform 305 indicating the Zerox signal is effective.

[Timing Chart During Start-Up of Fixing Device]

Figure 4:
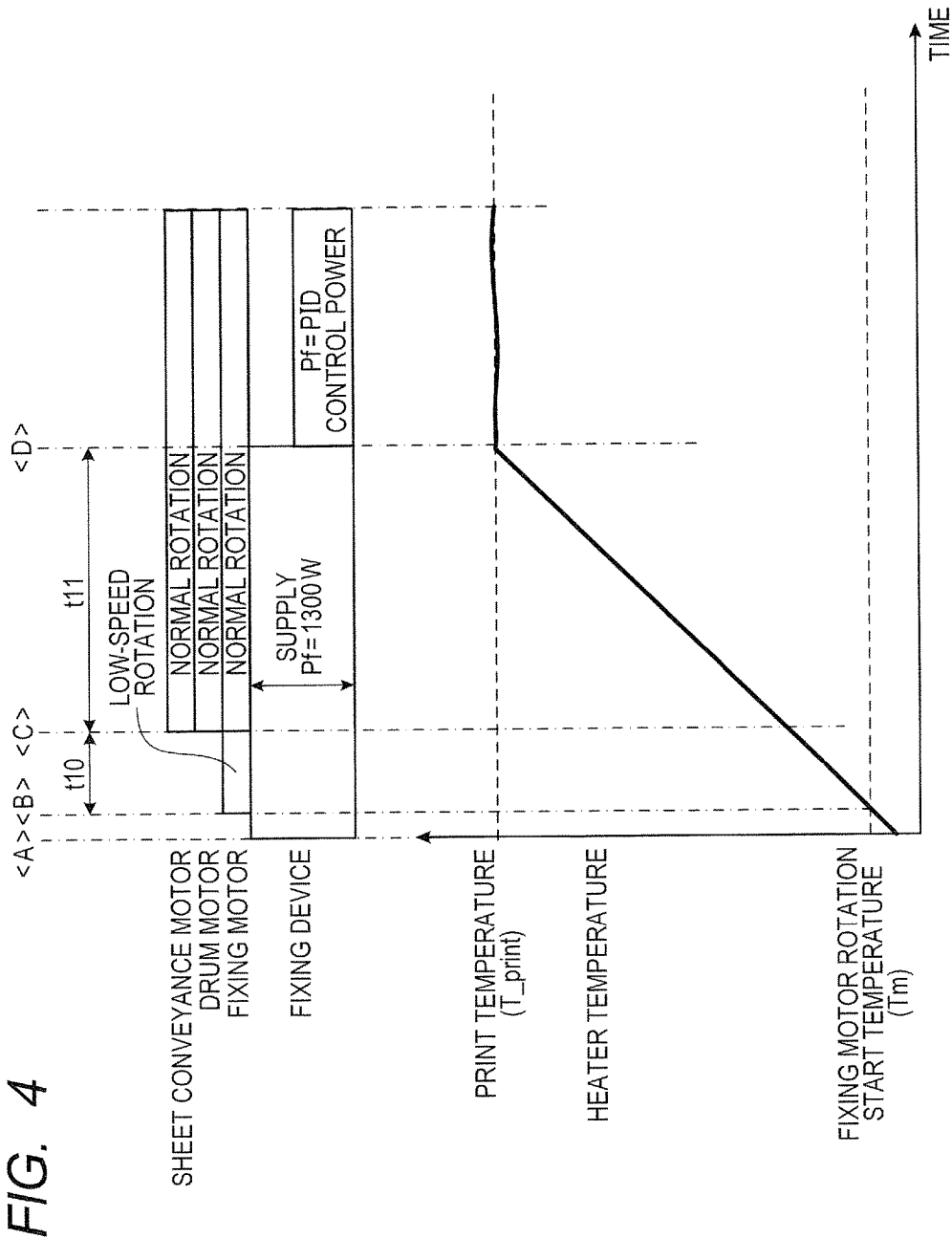
FIG. 4 is a time chart illustrating a control sequence of the power supply apparatus according to the first and second exemplary embodiments.

Next, a control operation of the power supply apparatus 200 in association with a start-up operation of the fixing device 100 in a print process of the image forming apparatus 10 will be described with reference to FIG. 4. FIG. 4 is a timing chart illustrating a change in the heater temperature of the fixing device 100, a state of power supply to the fixing device 100, and an operation state of each of the sheet conveyance roller 30, the drum motor 31, and the fixing motor 32, and the horizontal axis represents time. In FIG. 4, <A> to <D> represent time (timing). The heater temperature of the fixing device 100 is a temperature detected by the thermistor TH1 in the fixing device 100. The state of power supply to the fixing device 100 indicates a supplied power Pf supplied from the AC power supply 201 with respect to a fixing target temperature of the fixing device 100.

At a time A (indicated by <A> in FIG. 4; the same applies hereinafter) when the control unit 260 receives a print start instruction from an external computer or the like, the control unit 260 sets the drive signal to the high level. The control unit 260 supplies power to the fixing device 100 for a plurality of cycles of the Zerox signal at a predetermined fixed power duty (e.g., 50%). In this case, the control unit 260 obtains effective power values which are calculated by the power calculation unit 1 when power is supplied at the fixed power duty and are supplied to the fixing device 100, for a plurality of half waves, and calculates the average value of the effective power values. Next, the control unit 260 multiplies the supplied power Pf by the ratio between the power duty used for power supply and the average value of the actually detected effective power values, to thereby calculate the power duty used when the next supplied power Pf is supplied. In the next control cycle, power is supplied to the fixing device 100 based on the calculated power duty. The power duty for the next power supply is calculated also in the next control cycle, and the power duty is updated as needed. Consequently, the supplied power Pf for the fixing target temperature can be always supplied to the fixing device 100.

The control unit 260 starts rotation of the fixing motor 32 at a low speed at the time B when the heater temperature detected by the thermistor TH1 has reached a temperature Tm (first temperature) when the rotation of the fixing motor 32 can be started, and the driving unit of the fixing device 100 is driven. At the time C when a period T10, which is a predetermined period from the time B, has elapsed, the control unit 260 determines whether a series of image forming operations can be started. In the present exemplary embodiment, when a predetermined required power Pf_rdy (Pf=1300 W in FIG. 4) or more is suppliable to the fixing device 100, the series of image forming operation is started. When the control unit 260 can supply only the power of the predetermined required power Pf_rdy or less, the control unit 260 starts the series of image forming operation at a timing when the heater temperature has increased to a temperature T_rdy (temperature T_rdy in step S825 in FIGS. 7 and 9 described below), which is a predetermined second temperature. The temperature T_rdy is a temperature at which the recording paper reaches the fixing device 100 and the heater temperature of the fixing device 100 reaches a print temperature T_print after a lapse of a predetermined period t11 when the image forming operation is started in a state where the current power is supplied to the fixing device 100. The print temperature T_print is a temperature at which an unfixed toner image formed on the recording paper can be fixed onto a recording paper. In the present exemplary embodiment, assume that whether to input to the predetermined required power Pf_rdy is determined based on the average value of the effective power values, which are calculated by the power calculation unit 1 at the time C and are supplied to the fixing device 100, the power duty, and the predetermined required power Pf_rdy. However, the calculation of suppliable power based on, for example, the results of the current detection unit that detects a value of a current flowing into an inlet, and the power detection unit that detects power input to the fixing device 100, and determination whether to start a series of image forming operation, and the like are not limited to those in the present exemplary embodiment.

At the time C, the control unit 260 activates the sheet conveyance roller 30 and the drum motor 31 to start the series of image forming operation, and drives the sheet conveyance roller 30 and the drum motor 31 at a normal speed. Further, the control unit 260 changes the rotation of the fixing motor 32 from a low-speed rotation to a rotation at a normal speed, and drives the fixing motor 32. Then, the activation sequence of the fixing device 100 is terminated at the time D when the heater temperature detected by the thermistor TH1 reaches the print temperature T_print. The subsequent supplied power Pf is determined by PID control based on the heater temperature detected by the thermistor TH1. A period T11 which is a predetermined period is a period from a time when image formation is started until first recording paper reaches the fixing device 100 in a case where image formation is started at the time C.

As described above, the power supply apparatus 200 according to the present exemplary embodiment supplies the right amount of power to the fixing device 100 during a period from the time A to the time D. Thus, a fixing failure due to an excessive temperature rise or a temperature rise failure can be avoided. An appropriate determination for starting the series of image forming operation at the time C avoids an increase in FPOT when a fixing failure is caused due to a temperature rise failure, or when start of the image forming operation is delayed more than necessary. Also from this viewpoint, the accuracy of the result of detecting the effective power value that is input to the fixing device 100 and calculated by the power calculation unit 1 is extremely important.

[Input Voltage and Effective Power Value During Image Forming Operation]

Figure 5:
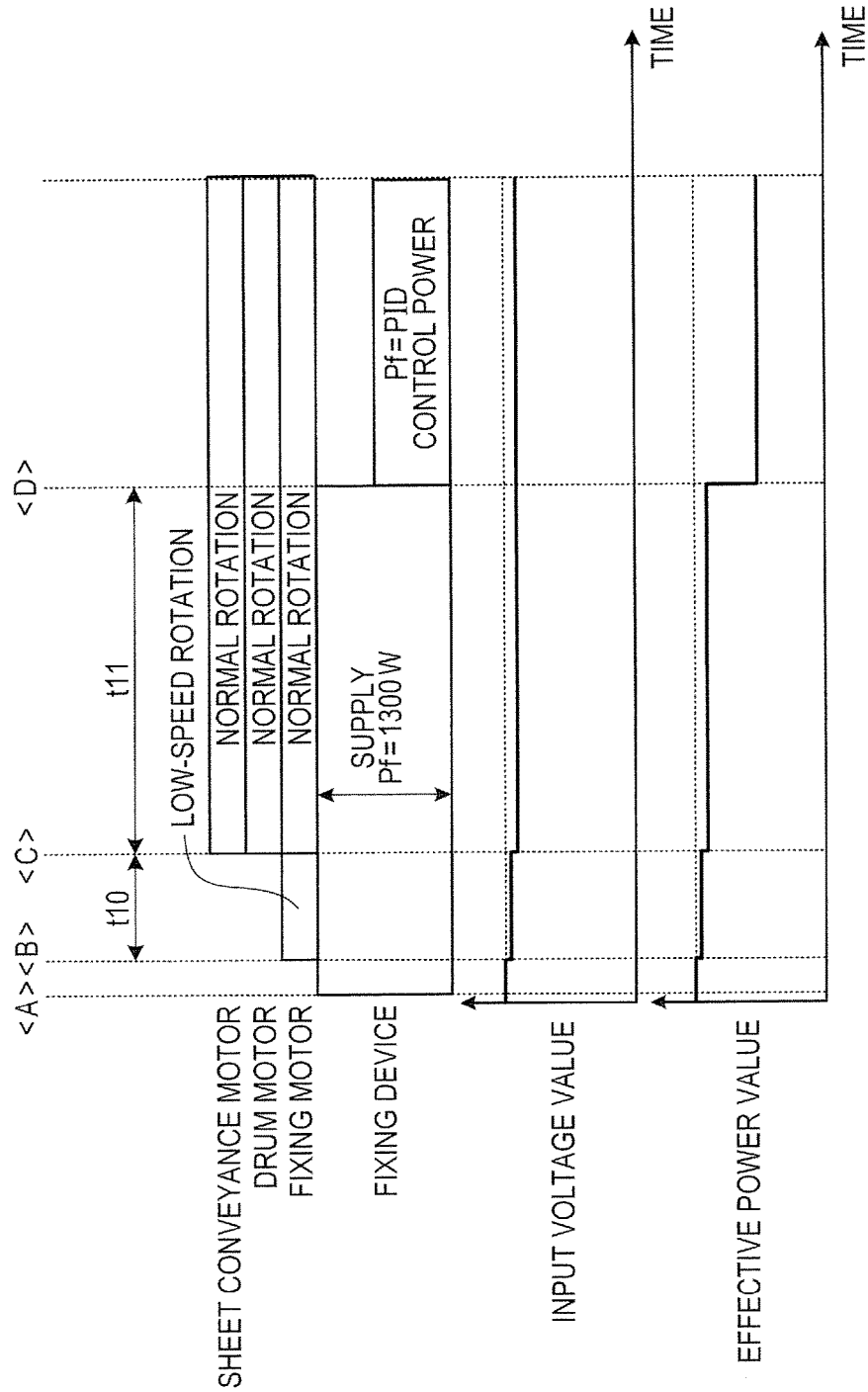
FIG. 5 is a diagram illustrating an operation state, an input voltage value, and an effective power value of a fixing device and each motor according to the first exemplary embodiment.

FIG. 5 is a timing chart indicating the state of power supply to the fixing device 100, the operation state of each of the sheet conveyance roller 30, the drum motor 31, and the fixing motor 32, the effective value voltage calculated by the voltage calculation unit 2, and the effective power value that is calculated by the power calculation unit 1 and input to the fixing device 100. The horizontal axis in FIG. 5 represents time. In FIG. 5, the input voltage value indicates the effective value voltage calculated by the voltage calculation unit 2, and the effective power value indicates the effective power value calculated by the power calculation unit 1. The times <A> to <D>, the periods t10 and t11 are similar to those in FIG. 4, and thus the descriptions thereof are herein omitted.

Referring to FIG. 5, at the time B when the fixing motor 32 is caused to rotate at a low-speed, and at the time C when the sheet conveyance roller 30, the drum motor 31, and the fixing motor 32 are caused to rotate at a normal speed to start the series of image forming operation, the input voltage value indicating the effective value voltage calculated by the voltage calculation unit 2 is decreased. A decrease in the effective value voltage is not due to a decrease in voltage supplied to the power supply apparatus 200 from the AC power supply 201, but instead is due to a decrease in voltage between B-B' illustrated in FIG. 2 to be lower than the voltage between A-A'. Accordingly, the voltage calculation unit 2 that calculates the effective value voltage by the output voltage Vout2 based on the output voltage Vout1 of the transformer T1 cannot accurately detect the input voltage of the AC power supply 201.

The voltage between B-B' illustrated in FIG. 2 decreases for the following reasons. That is, a drive current is supplied to the fixing motor 32 from the day time power supply 221 to cause the fixing motor 32 to rotate at a low speed at the time B. In this case, a current generated when the day time power supply 221 is operated flows to an impedance from the AC power supply 201 to B-B' in FIG. 2, so that a voltage drop to be lower than the voltage between A-A' occurs. The impedance that causes a voltage drop in this case is, for example, a noise filter (not illustrated), a circuit board pattern, or a switching element which is present between the AC power supply 201 and B-B' in FIG. 2. Further, at the time C, the value of the current to be supplied to the day time power supply 221 from the AC power supply 201 is increased to cause the fixing motor 32, the sheet conveyance roller 30, and the drum motor 31 to operate at the normal rotation, so that the effective value voltage calculated by the voltage calculation unit 2 further decreases.

Like the effective value voltage, also for the effective power value calculated by the power calculation unit 1, the effective power value decreases at the time B when the fixing motor 32 is caused to rotate at a low speed, and at the time C when the sheet conveyance roller 30, the drum motor 31, and the fixing motor are caused to rotate at a normal speed. A decrease in the effective power value is not due to a decrease in the effective power actually supplied to the fixing device 100, but instead is due to a decrease in the voltage between B-B' illustrated in FIG. 2 to be lower than the voltage between A-A'. Specifically, a decrease in the effective power value is due to the fact that the power calculation unit 1 that calculates the effective power value of the input voltage of the AC power supply 201 by the output voltage Vout2 based on the output voltage Vout1 of the transformer T1 cannot accurately calculate the effective power. The power calculation unit 1 calculates the effective power value by multiplying the input voltage waveform of the AC power supply 201 that is detected by the transformer T1 by the current waveform that is detected by the transformer T2 and flows to the fixing device 100. Accordingly, when the output voltage Vout2 based on the output voltage Vout1, which is lower than the input voltage of the AC power supply 201 from the transformer T1, is input to the power calculation unit 1 from the phase adjustment unit 210, the effective power value to be calculated is smaller by an amount equal to a voltage decrease.

[Detection Error of Power Calculation Unit]

FIG. 6 is a table illustrating a specific example of a detection error in the effective power value detected in the power calculation unit 1. The table illustrated in FIG. 6 includes items of the input voltage, the voltage between B-B' illustrated in FIG. 2, the current value (current value of the fixing device in the figure) supplied from the AC power supply 201 to the fixing device 100, and the actual effective power value of the fixing device 100. The table illustrated in FIG. 6 also includes items of the effective power value (indicated by the effective power value calculated by the power calculation unit in the figure) calculated by the power calculation unit 1, and an error in the effective power value (indicated by a detection error in the figure). In FIG. 6, the input voltage that is the AC voltage of the AC power supply 201 is 110 V. The voltage between B-B' (input voltage value calculated by the voltage calculation unit 2) illustrated in FIG. 2 is 105 V, and a decrease in the voltage between B-B' is 5 V (=110 V−105 V). The current values supplied to the fixing device 100 are 12 A, 10 A, 8 A, and 6 A. The actual effective power value of the fixing device 100 indicates the power value calculated by (input voltage)×(current value supplied to the fixing device 100). The effective power value calculated by the power calculation unit 1 indicates the power value calculated by (voltage between B-B')×(current value supplied to the fixing device 100). The detection error of the effective power value is indicated by the calculation result of (effective power calculated by the power calculation unit 1)−(actual effective power value of the fixing device 100).

As seen from FIG. 6, the effective power value calculated by the power calculation unit 1 includes a detection error of 60 W at maximum (when the current value of the fixing device is 12 A). It is also obvious that the detection error of the effective power value calculated by the power calculation unit 1 also varies depending on the current value supplied to the fixing device 100. FIG. 6 illustrates an example in which a voltage drop between the AC power supply 201 and the voltage between B-B' is 5 V. For example, when the day time power supply 221 operates, the detection error of the effective power value calculated by the power calculation unit 1 varies also depending on a voltage drop in association with the current supplied from the AC power supply 201 to the day time power supply 221.

[Correction of Detection Error of Effective Power Value]

Next, a method for correcting the detection error of the effective power value calculated by the power calculation unit 1 due to a voltage drop as a described above will be described as a feature of the present exemplary embodiment. Upon receiving the print start instruction, the control unit 260 sets the Drive2 signal to the high level to turn on the triac Q7, and starts current supply (power supply) so that the current supplied from the AC power supply 201 flows to the voltage detection device 240 and the day time power supply 221. The control unit 260 obtains the effective value voltage (input voltage value) calculated by the voltage calculation unit 2 when the current supply is started, and sets the obtained effective value voltage as an initial voltage V0 (second voltage). At this timing, the activation of each motor or the like in association with the start of image formation is not started, and thus the day time power supply 221 is supplied with also most no current from the AC power supply 201. Accordingly, no voltage drop occurs in the voltage between B-B' illustrated in FIG. 2, and thus the input voltage of the AC power supply 201 matches the voltage value of the initial voltage V0.

During the period from the time A to the time D (FIG. 5), the control unit 260 always obtains an effective power value P1 during operation that is the effective power value (effective power detected value) calculated by the power calculation unit 1, and an effective value voltage V1 (first voltage) during operation that is the effective value voltage detect value calculated by the voltage calculation unit 2. The control unit 260 calculates a corrected effective power value Pfu by the following formula (1) based on the obtained effective power value P1 during operation and the effective value voltage V1 during operation.

$$Pfu=V0\times(P1/V1) \quad (1)$$

The control unit 260 calculates the corrected effective power value Pfu every period the effective power value P1 during operation and the effective value voltage V1 during operation are obtained. Thus, the control unit 260 calculates the value of the current flowing to the fixing device 100 by the formula (P1/V1) based on the obtained effective power value P1 during operation and the effective value voltage V1 during operation. Further, the control unit 260 calculates the corrected effective power value Pfu by multiplying the calculated current value by the initial voltage V0 that matches the input voltage of the AC power supply 201 described above. Accordingly, even when the voltage between B-B' illustrated in FIG. 2 becomes lower than the voltage between A-A' due to the current supplied from the AC power supply 201 when the day time power supply 221 is operated, the effective power value can be calculated accurately. In the present exemplary embodiment, the effective power value P1 during operation and the current flowing from the effective value voltage V1 to the fixing device 100 during operation are calculated, and the effective power value is calculated based on the calculated current value. However, the present invention is not limited to this method. For example, the current flowing to the fixing device 100 may be directly detected, and the effective power value may be calculated from the detected current value.

[Control Sequence of Fixing Device Start-Up]

Figures 7, 7A:
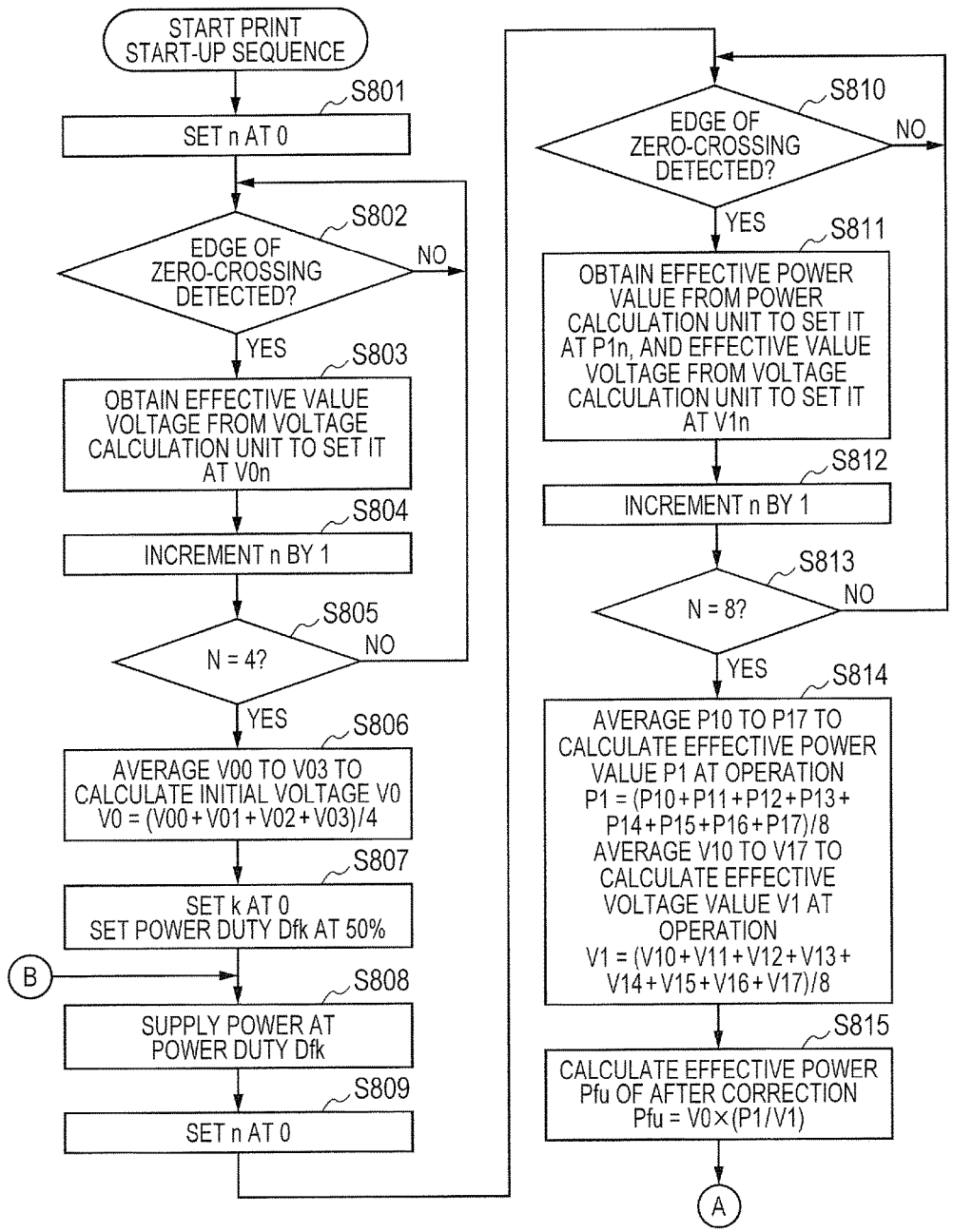
FIG. 7, which is consist of FIGS. 7A and 7B, is a flowchart illustrating a control sequence of the power supply apparatus according to the first exemplary embodiment.
Figure 7B:
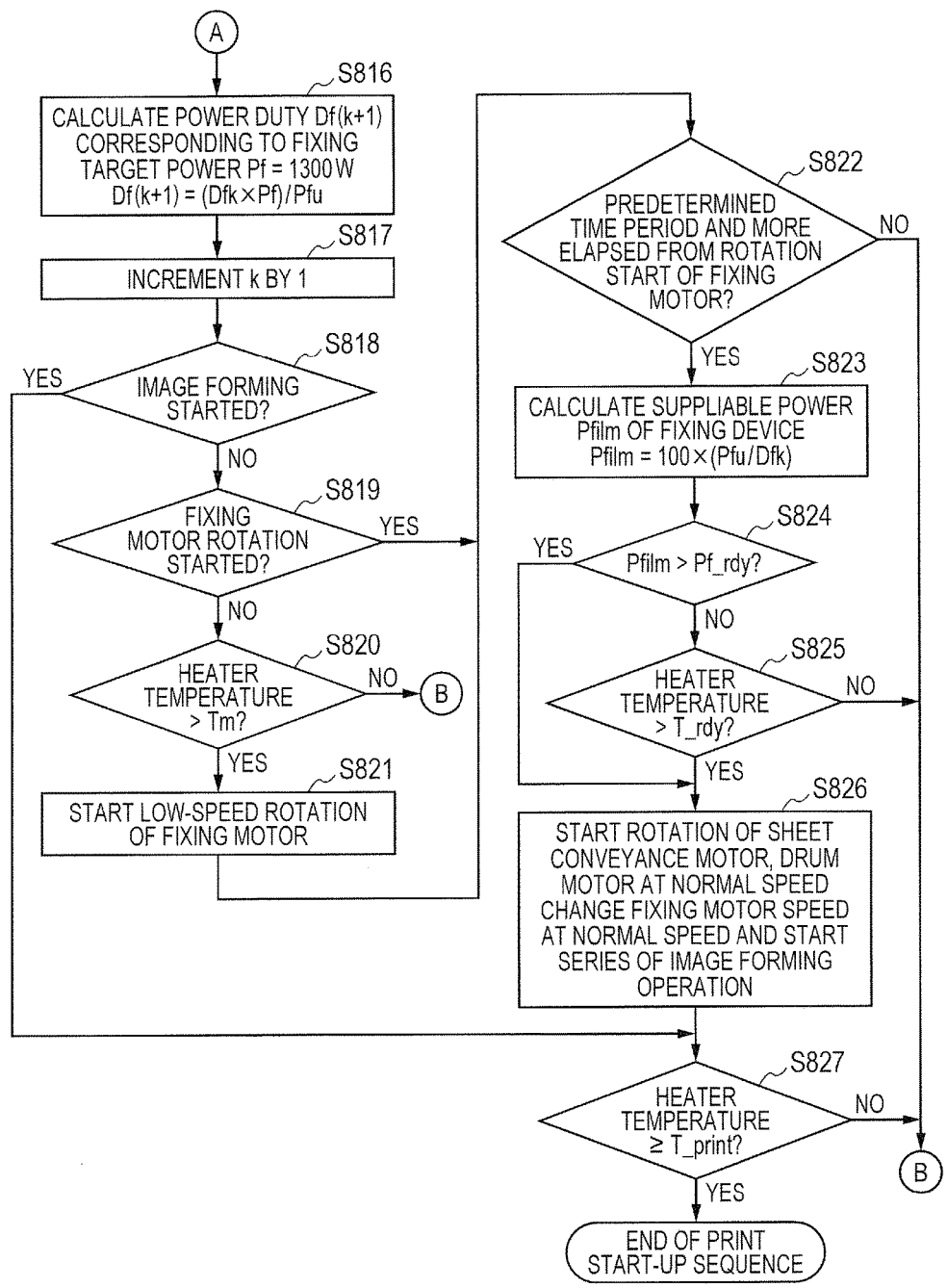

Next, a control sequence during print start-up including correction of the detection error of the effective power value due to a voltage drop according to the present exemplary embodiment will be described with reference to FIG. 7. FIG. 7 is a flowchart illustrating a control sequence of the fixing device 100 in association with the start of the image forming operation. Processing illustrated in FIG. 7 is executed by the control unit 260 when an image formation instruction is received. The control unit 260 sets the Drive2 signal to the high level to turn on the triac Q7 prior to the execution of processing illustrated in FIG. 7, and current supply is performed so that the current supplied from the AC power supply 201 flows to the voltage detection device 240 and the day time power supply 221.

In step (hereinafter abbreviated as "S") S801, the control unit 260 performs an initial setting for a counter n to set the counter n to "0". In S802, the control unit 260 determines whether an edge of the zero-crossing signal (Zerox signal) output from the comparator IC2 is detected. There are two types of edge detection, i.e., detection of a rising edge (a change from the low level to the high level) and detection of a falling edge (a change from the high level to the low level). The control unit 260 detects both the rising edge and the falling edge. When the control unit 260 determines that an edge of the zero-crossing signal is detected, the processing proceeds to S803. When the control unit 260 determines that an edge is not detected, the processing returns to S802.

In S803, the control unit 260 obtains the detected value of the effective value voltage by the voltage calculation unit 2 of the calculation unit IC1 using the power signal, and obtains a voltage V0n. In S804, the control unit 260 increments the counter n increment (updates the counter with +1). In S805, the control unit 260 determines whether the value of the counter n is 4. When it is determined that the value of the counter n is 4, the processing proceeds to S806. When it is determined that the value of the counter n is not 4, the processing returns to S802.

In S806, the control unit 260 calculates an average value of detect values V00, V01, V02, and V03 of the effective value voltage of four half-waves obtained in the processing of S803 by the following formula (2), and the calculated average value is set as the initial voltage V0.

$$V0=(V00+V01+V02+V03)/4 \quad (2)$$

In S807, the control unit 260 performs an initial setting of a counter k to set "0" to the counter k, and further sets 50% to a power duty Dfk indicating the power duty to be supplied to the fixing device 100.

In S808, the control unit 260 sets the drive signal to the high level to supply power to the heating member RH1, which serves as the heater unit of the fixing device 100, according to the power duty Dfk. In S809, the control unit 260 performs the initial setting of the counter n, and sets "0" to the counter n. In S810, the control unit 260 determines whether an edge of the zero-crossing signal (Zerox signal) output from the comparator IC2 is detected, like in S802. When the control unit 260 determines that an edge of the zero-crossing signal is detected, the processing proceeds to S811. When the control unit 260 determines that an edge is not detected, the processing returns to S810.

In S811, the control unit 260 obtains the detected value of the effective power by the power calculation unit 1 of the calculation unit IC1 using the power signal, and obtains an effective power value P1n. Further, the control unit 260 obtains the detected value of the effective value voltage by the voltage calculation unit 2 of the calculation unit IC1 using the power signal, and obtains a voltage V1n. In S812, the control unit 260 increments the counter n (updates the counter with +1). In S813, the control unit 260 determines whether the value of the counter n is 8. When it is determined that the value of the counter n is 8, the processing proceeds to S814. When it is determined that the value of the counter n is not 8, the processing returns to S810.

In S814, the control unit 260 calculates an average value of detected values P10 to P17 of the effective power of eight half-waves obtained in the processing of S811 by the following formula (3), and the calculated average value is set as the effective power value P1 during operation. Further, the control unit 260 calculates an average value of detected values V10 to V17 of the effective value voltage of eight half-waves obtained in the processing of S811 by the following formula (4), and the calculated average value is set as the effective value voltage V1 during operation.

$$P1=(P10+P11+P12+P13+P14+P15+P16+P17)/8 \quad (3)$$

$$V1=(V10+V11+V12+V13+V14+V15+V16+V17)/8 \quad (4)$$

In S815, the control unit 260 calculates the corrected effective power value Pfu by the following formula (5) using the effective power value P1 during operation that is calculated in S813, the effective value voltage V1 during operation, and the initial voltage V0 calculated in S806.

$$Pfu=V0\times(P1/V1) \quad (5)$$

In S816, the control unit 260 calculates the next power duty Df(k+1) by the following formula (6) so that the amount of power supplied to the heater of the fixing device 100 becomes the power amount corresponding to the predetermined fixing target power Pf (=1300 W).

$$Df(k+1)=(Dfk\times Pf)/Pfu \quad (6)$$

In S817, the control unit 260 increments the counter K.

In S818, the control unit 260 determines whether the image forming operation is already started by processing of S826 described below. When the control unit 260 determines that the image forming operation is already started, the processing proceeds to S827. When the control unit 260 determines that the image forming operation is not started yet, the processing proceeds to S819. In S819, the control unit 260 determines whether the low-speed rotation of the fixing motor 32 is already started by the processing of S821 described below. When it is determined that the low-speed rotation of the fixing motor 32 is already started, the processing proceeds to S822. When it is determined that the low-speed rotation of the fixing motor 32 is not started yet, the processing proceeds to S820. In S820, the control unit 260 determines whether the heater temperature of the fixing device 100 that is obtained based on the TH signal is higher than a rotation start temperature Tm of the fixing motor 32. When the control unit 260 determines that the heater temperature is higher than the rotation start temperature Tm, the processing proceeds to S821. When the control unit 260 determines that the heater temperature is equal to or lower than the rotation start temperature Tm, the processing returns to S808. In S821, the control unit 260 starts the low-speed rotation of the fixing motor 32 to drive the driving unit of the fixing device 100. Further, the control unit 260 resets and starts the timer to measure an elapsed time from the start of the rotation of the fixing motor 32.

In S822, the control unit 260 refers to the timer and determines whether a period t10 (FIG. 4), which is a predetermined period from the start of the rotation of the fixing motor 32, has elapsed. When the control unit 260 determines that the period t10 (FIG. 4) has elapsed, the processing proceeds to S823. When the control unit 260 determines that the period t10 has not elapsed, the processing returns to S808. In S823, the control unit 260 calculates a suppliable power value Pflim that is suppliable to the fixing device 100 by the following formula (7).

$$Pflim=100\times(Pfu/Dfk) \quad (7)$$

In S824, the control unit 260 determines whether the suppliable power value Pflim calculated in S823 is greater than the predetermined required power Pf_rdy (e.g., 1300 W (FIG. 4)) which enables the image forming operation to be started. When the control unit 260 determines that the suppliable power value Pflim is greater than the required power Pf_rdy (Pflim>Pf_rdy), the processing proceeds to S826. On the other hand, when the control unit 260 determines that the suppliable power value Pflim is equal to or less than the required power Pf_rdy (required power amount or less) (Pflim≤Pf_rdy), the processing proceeds to S825. In S825, the control unit 260 determines whether the heater temperature of the fixing device 100 that is obtained based on the TH signal is higher than the predetermined temperature T_rdy which is the heater temperature that enables image formation to be started. When the control unit 260 determines that the heater temperature is higher than the temperature T_rdy, the processing proceeds to S826. When the control unit 260 determines that the heater temperature is equal to or lower than the temperature T_rdy, the processing returns to S808.

In step S826, the control unit 260 starts the normal-speed rotation of the sheet conveyance roller 30 and the drum motor 31 to start a series of image forming operation. Further, the control unit 260 changes the rotation speed of the fixing motor 32 from the low speed to the normal speed to start the series of image forming operation, and the processing proceeds to S827. In S827, the control unit 260 determines whether the heater temperature of the fixing device 100 that is obtained based on the TH signal is equal to or higher than the temperature T_print which is the temperature at which an unfixed toner image formed on recording paper can be fixed onto the recording paper. When the control unit 260 determines that the heater temperature is equal to or higher than the temperature T_print, the processing ends. When the control unit 260 determines that the heater temperature is lower than the temperature T_print, the processing returns to S808.

By the control sequence described above, the correction of the detection error of the effective power value due to a decrease in the input voltage of the AC power supply 201 improves the power detection accuracy and enables appropriate power control and appropriate determination of the image formation start timing. As a result, shortening of FPOT (First Print Out Time) according to the power suppliable level can be achieved without causing an image failure such as a fixing failure.

As described above, according to the present exemplary embodiment, it is possible to accurately detect power to be supplied to the heat fixing device.

The method for correcting the detection error of the effective power value due to a voltage drop has been described above in the first exemplary embodiment. In a second exemplary embodiment, a method for correcting the detection error of the effective power value when the input voltage of the AC power supply varies is described. In the following description, the configurations of the image forming apparatus 10 and power supply apparatus 200 of the present exemplary embodiment are similar to those of the first exemplary embodiment. Components of the second exemplary embodiment that are the same as those of the first exemplary embodiment are denoted by the same reference numerals, and thus the descriptions thereof are herein omitted.

[Timing Chart During Start-Up of Fixing Device]

Figure 8:
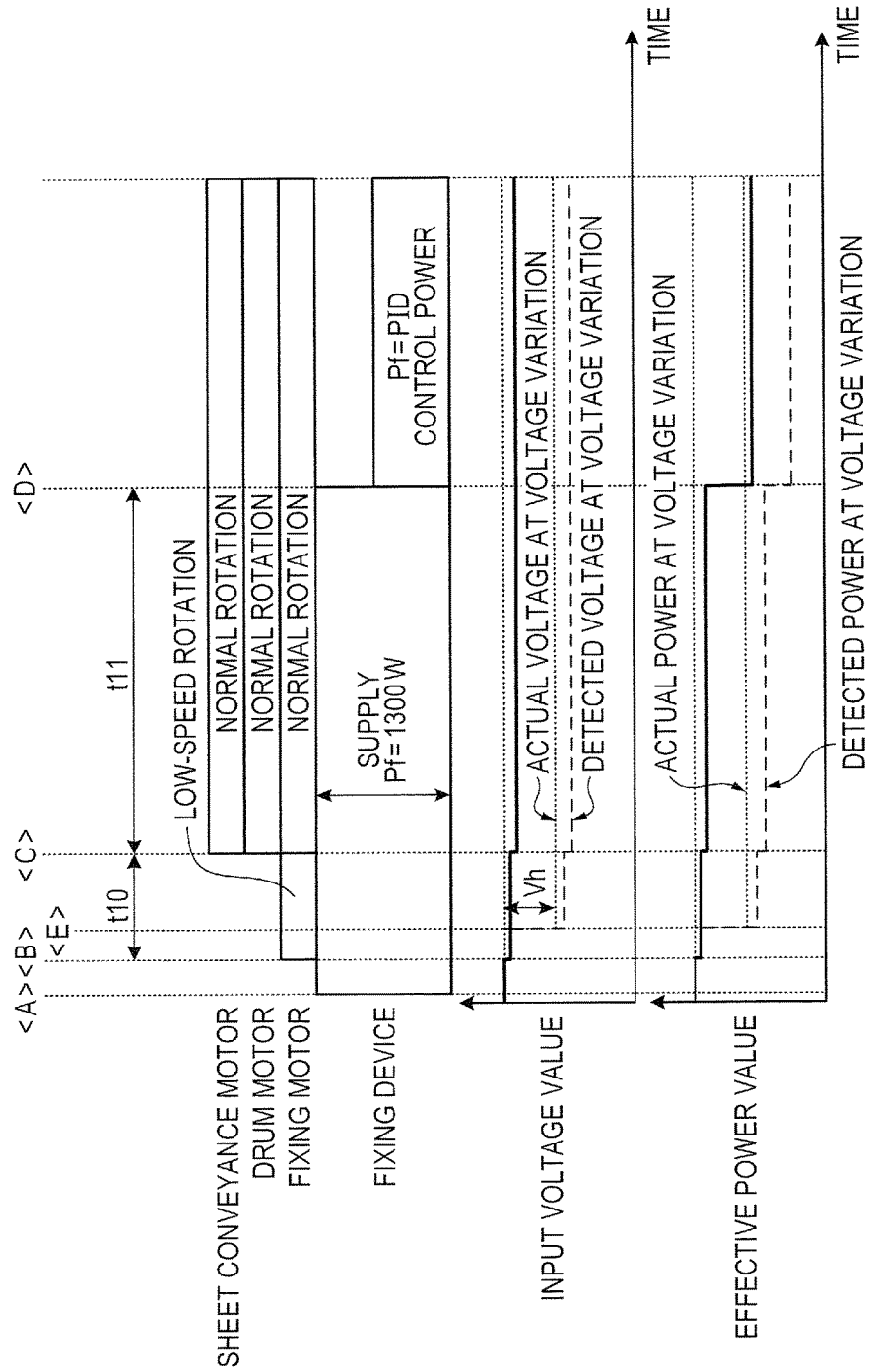
FIG. 8 is a diagram illustrating a change in an operation state, an input voltage value, and an effective power value of a fixing device and each motor according to a second exemplary embodiment.

FIG. 8 is a timing chart illustrating the state of power supply to the fixing device 100, the operation state of each of the sheet conveyance roller 30, the drum motor 31, and the fixing motor 32, the input voltage value of the AC power supply 201, and the effective power value of the fixing device 100 when the input voltage of the AC power supply 201 varies. The horizontal axis in FIG. 8 represents time. In FIG. 8, the input voltage value indicates the effective value voltage detected by the voltage calculation unit 2, and the effective power value indicates the effective power value detected by the power calculation unit 1. The times <A> to <D> and the periods T10 and t11 are similar to those in FIGS. 4 and 5, and thus the descriptions thereof are herein omitted.

At a time E, when the input voltage of the AC power supply 201 varies in a direction in which the voltage decreases by Vh volts, the effective value voltage detected by the voltage calculation unit 2 also decreases by Vh volts (broken line). Further, when the input voltage of the AC power supply varies in a direction in which the voltage decreases by Vh volts, the actual power and the effective power value that is detected by the power calculation unit 1 and supplied to the fixing device 100 also decrease in the same manner (broken line). As a result, a decrease in the detected voltage due to a variation in the input voltage of the AC power supply may be detected as a detection error due to a decrease in the voltage between B-B' illustrated in FIG. 2. Accordingly, in the present exemplary embodiment, when the effective value voltage detected by the voltage calculation unit 2 is lower than the initial voltage V0 by a predetermined voltage or more, the correction of the detection error of the effective power detected value due to a voltage decrease, which is performed in the first exemplary embodiment, is not carried out. Consequently, erroneous detection caused by a decrease in the detected voltage due to a variation in the input voltage of the AC power supply can be prevented.

A maximum value of a decrease in the voltage between B-B' illustrated in FIG. 2 due to the operation of the day time power supply 221 can be estimated from a resistor value from a voltage input unit of the AC power supply 201 to the transformer T1, an ON voltage of the triac Q7, and a maximum value of a current flowing to the day time power supply 221. Assume herein that the estimated maximum value of the voltage drop is set as a correction threshold voltage Vth. In the present exemplary embodiment, when the voltage difference between the above-described initial voltage V0 and the effective value voltage V1 during operation is larger than the correction threshold voltage Vth (V0−V1>Vth), the correction of the detection error of the effective power detected value due to a voltage drop is not carried out. Thus, erroneous detection caused by a decrease in the detected voltage due to a variation in the input voltage of the AC power supply 201 can be prevented.

[Control Sequence of Fixing Device Start-Up]

Figures 9, 9A, 9B:
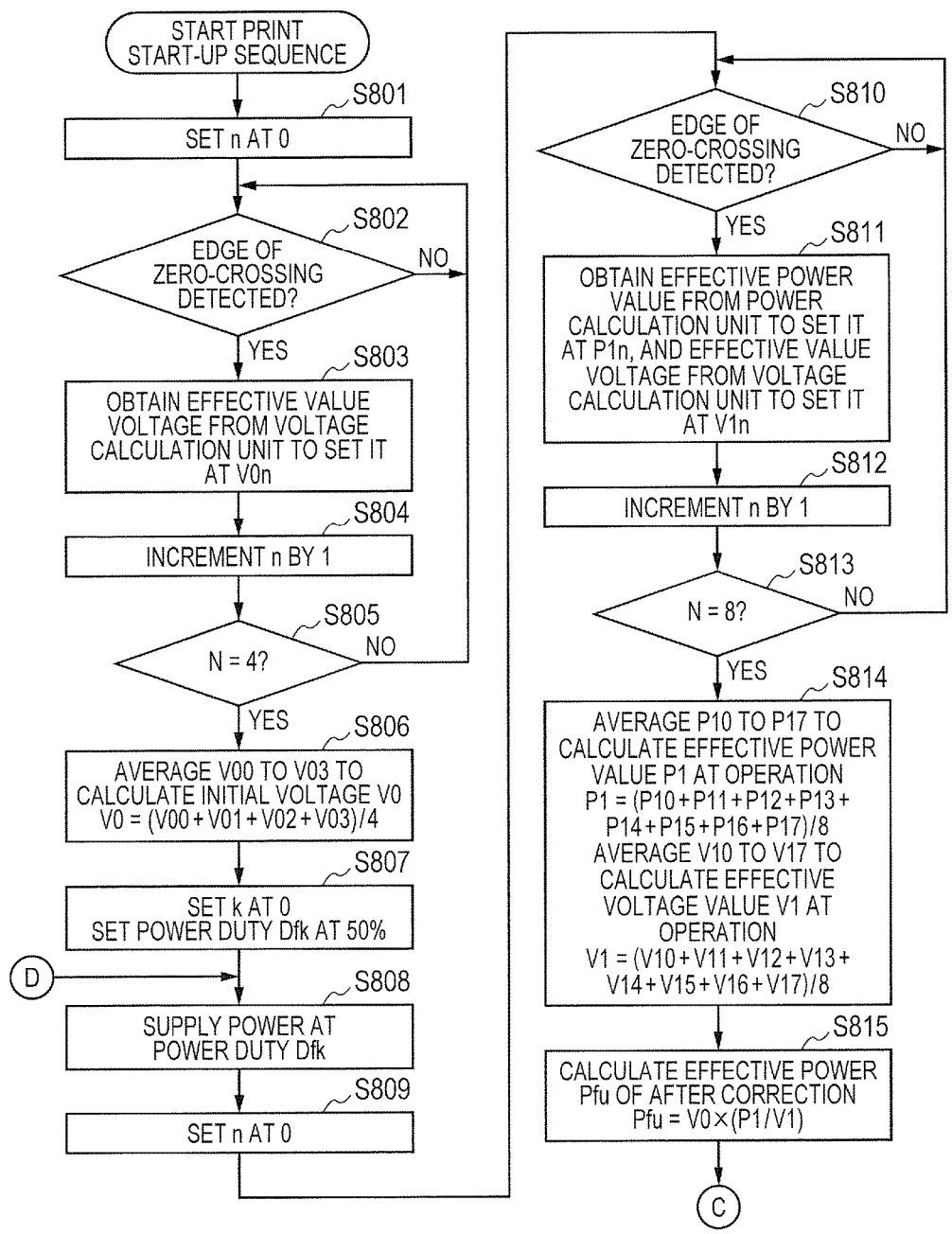
FIG. 9, which is consist of FIGS. 9A and 9B, is a flowchart illustrating a control sequence of a power supply apparatus according to the second exemplary embodiment.
Figure 9B:
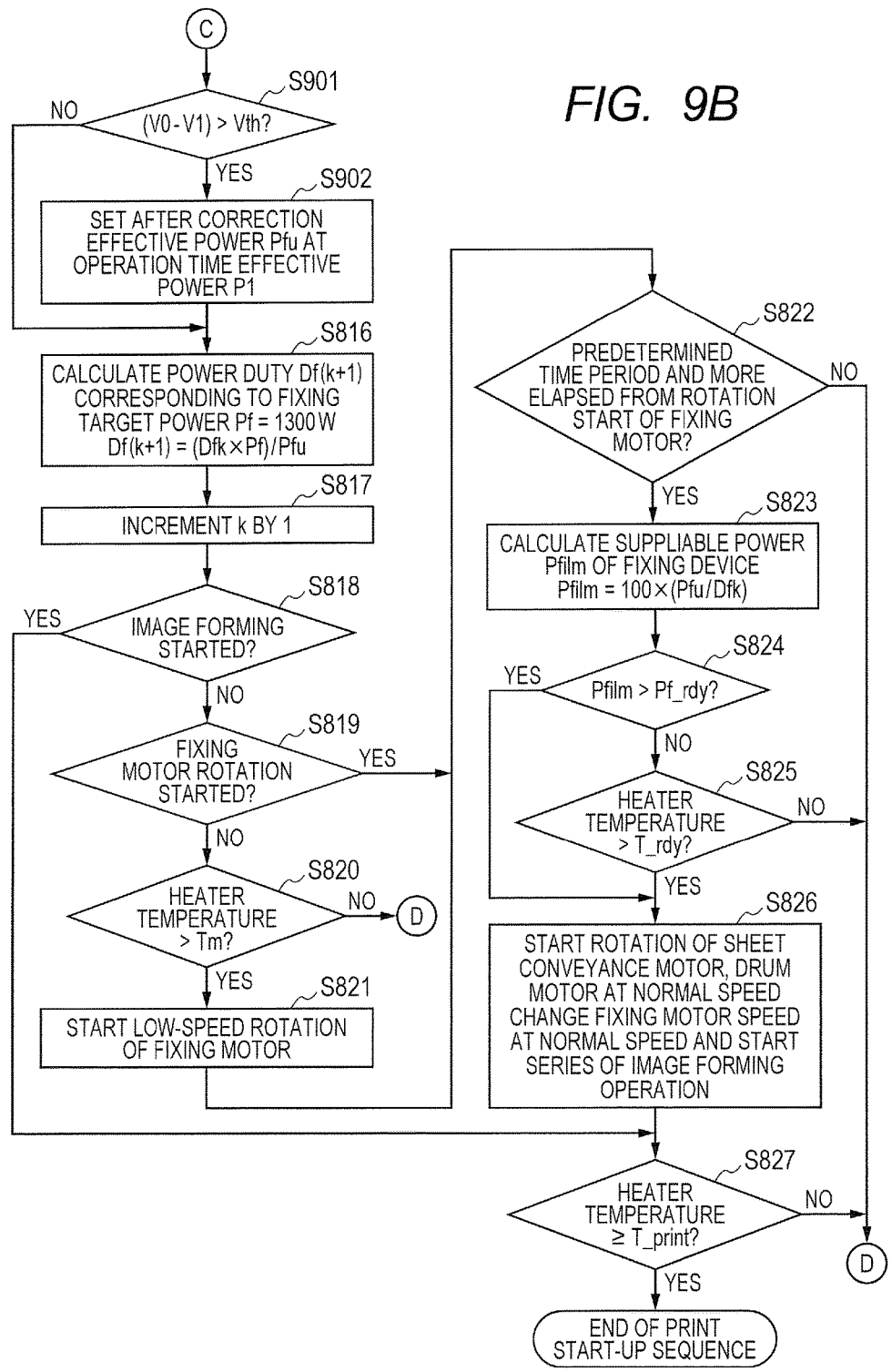

Next, a control sequence during print start-up including correction of the detection error of the effective power value due to a voltage drop according to the present exemplary embodiment will be described with reference to FIG. 9. FIG. 9 is a flowchart illustrating a control sequence of the fixing device 100 in association with the start of the image forming operation. Processing illustrated in FIG. 9 is executed by the control unit 260 when the image formation instruction is received. The control unit 260 sets the Drive2 signal to turn on the triac Q7 prior to the execution of processing illustrated in FIG. 7, and current supply is performed so that the current supplied from the AC power supply 201 flows to the voltage detection device 240 and the day time power supply 221.

Steps in FIG. 9 that indicate the same processing as that in FIG. 7 according to the first exemplary embodiment are denoted by the same step numbers, and the descriptions thereof are omitted. The control unit 260 obtains the initial voltage V0 by processing of S801 to S806. Next, the control unit 260 starts supplying power to the fixing device 100 in S808, calculates the effective power value P1 during operation and the effective value voltage V1 during operation in S809 to S815, and calculates the corrected effective power value Pfu.

In S901, the control unit 260 determines whether the effective value voltage V1 during operation decreases due to a variation in the input voltage of the AC power supply 201 or the like and the voltage difference between the effective value voltage V1 and the initial voltage V0 is greater than the correction threshold voltage Vth ((V0−V1)>Vth). When the control unit 260 determines that the voltage difference is greater than the correction threshold voltage Vth ((V0−V1) >Vth), the processing proceeds to S902. On the other hand, when the control unit 260 determines that the voltage difference is not greater than the correction threshold voltage Vth, i.e., the voltage difference is equal to or less than the correction threshold voltage Vth ((V0−V1)≤Vth), the processing proceeds to S816. Thus, when the voltage difference is equal to or less than the correction threshold voltage Vth, the same processing as that in FIG. 7 of the first exemplary embodiment is carried out.

In S902, the control unit 260 sets the corrected effective power Pfu as the effective power value P1 during operation (Pfu=P1). Thus, the correction of the detection error of the effective power detected value due to a voltage drop of the input voltage of the AC power supply 201 is not carried out.

The processing of S816 to S827 is similar to the processing of S816 to S827 illustrated in FIG. 7 of first exemplary embodiment, and thus the descriptions thereof are herein omitted. In the present exemplary embodiment, the determination as to whether to correct the detection error of the effective power detected value due to a voltage drop is made by determining whether the difference value between the initial voltage V0 and the effective value voltage V1 during operation is greater than the correction threshold voltage Vth which is a predetermined value. However, the determination criterion is not limited to this method. For example, a method of comparing the initial voltage V0 with a voltage predicted value Vr of the AC power supply 201 that is calculated by multiplying the value of the current flowing to the fixing device 100 that is calculated from the effective value voltage V1 during operation and the effective power value P1, by the resistor value of the heating member RH1 may be employed. When the difference value between the initial voltage V0 and the voltage predicted value Vr of the AC power supply 201 is greater than the correction threshold voltage Vth ((V0−Vr)>Vth), the correction of the detection error of the effective power detected value due to a voltage drop may be omitted. Further, in the present exemplary embodiment, the predetermined voltage is used as the correction threshold voltage Vth, but instead, for example, the correction threshold Vth may be determined according to a predicted value of a current flowing to the day time power supply 221.

By the control sequence described above, the correction of the detection error of the effective power detected value due to a voltage drop is carried out if a variation in the input voltage of the AC power supply falls within a predetermined range. On the other hand, if a variation in the input voltage of the AC power supply is larger than the predetermined range, the correction of the detection error of the effective power detected value due to a voltage drop of the input voltage of the AC power supply 201 may be omitted. In this manner, the determination as to whether it is necessary to correct the detection error of the effective power value is made according to a variation range of the input voltage of the AC power supply improves the power detection accuracy and enables appropriate power control and appropriate determination of the image formation start timing. Consequently, shortening of FPOT (First Print Out Time) according to the power suppliable level can be achieved without causing an image failure such as a fixing failure.

As described above, according to the present exemplary embodiment, it is possible to accurately detect power to be supplied to the heat fixing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-001336, filed Jan. 6, 2017, which is hereby incorporated by reference herein in its entirety.

What is claimed is:

1. A power supply apparatus configured to supply power to a load, comprising:
  a first line and a second line each of which receives an AC voltage from an AC power supply;
  a conversion element configured to convert the AC voltage input to each of the first line and the second line into a current according to the AC voltage;
  a voltage detection device including a first transformer including a primary winding and a secondary winding, the voltage detection device configured to detect an AC voltage based on a signal indicating the AC voltage output from the secondary winding of the first transformer by supplying the current converted by the conversion element to the primary winding;
  a current detection unit including a second transformer having a primary winding and a secondary winding, the current detection unit configured to detect a current value of a current supplied to a first load included in the load based on a signal indicating an AC voltage output to a secondary side of the second transformer according to the current by supplying the current to the primary winding;
  a zero-crossing detection unit configured to detect a zero-crossing timing of the AC power supply based on a signal indicating the AC voltage detected by the voltage detection device;
  a voltage calculation unit configured to calculate a voltage of the AC power supply based on the signal indicating the AC voltage detected by the voltage detection device and the zero-crossing timing of the AC power supply detected by the zero-crossing detection unit;
  a power calculation unit configured to calculate an amount of power to be supplied to the first load from the AC power supply based on a value of a current to be supplied to the first load detected based on the signal indicating the AC voltage output from the current detection unit, and a voltage value of the AC voltage calculated by the voltage calculation unit;
  a switching unit configured to connect or disconnect a current path from the AC power supply to the primary winding of the first transformer and a power supply configured to output a predetermined DC voltage to a second load included in the load; and
  a control unit configured to control the switching unit and control power supply to the first load and the second load,
  wherein the control unit corrects the amount of power calculated by the power calculation unit based on a first voltage of the AC power supply calculated by the voltage calculation unit when the amount of power is calculated, and a second voltage of the AC power supply calculated by the voltage calculation unit when the switching unit is controlled to start power supply to the power supply and the first transformer from the AC power supply.

2. The power supply apparatus according to claim 1, comprising a phase adjustment unit provided at a subsequent stage of the voltage detection device, the phase adjustment unit configured to adjust a phase of a signal indicating the AC voltage output from the voltage detection device in such a manner that a phase difference between the signal and a signal indicating an AC voltage of the AC power supply is decreased,
  wherein the zero-crossing detection unit detects the zero-crossing timing using a signal indicating the AC voltage having a phase adjusted by the phase adjustment unit, and
  wherein the voltage calculation unit calculates a voltage of the AC power supply using the signal indicating the AC voltage having the phase adjusted by the phase adjustment unit.

3. The power supply apparatus according to claim 1, wherein the control unit does not correct the amount of power when a difference of a voltage value obtained by subtracting the first voltage from the second voltage is larger than a predetermined voltage value.

4. The power supply apparatus according to claim 3, wherein the predetermined voltage value is determined based on a maximum value of a current to be supplied to the power supply from the AC power supply.

5. The power supply apparatus according to claim 1, wherein the conversion element comprises a first resistor and a second resistor,
  one end of the first resistor is connected to the first line, and another end of the first resistor is connected to one end of the primary winding of the first transformer, and
  one end of the second resistor is connected to the second line, and another end of the second resistor is connected to another end of the primary winding of the first transformer.

6. The power supply apparatus according to claim 1, wherein one end of the first load is connected to the first line and another end of the first load is connected to one end of the primary winding of the second transformer, and
  another end of the primary winding is connected to the second line.

7. An image forming apparatus comprising:
  an image forming unit configured to form an image on a recording material;
  a fixing unit including a heating resistor member, the fixing unit configured to fix an unfixed toner image formed on the recording material onto the recording material;
  a power supply unit configured to supply power to the fixing unit,
  wherein the power supply unit includes:
  a first line and a second line each receiving an AC voltage from an AC power supply;
  a conversion element configured to convert the AC voltage input to each of the first line and the second line into a current according to the AC voltage;
  a voltage detection device including a first transformer including a primary winding and a secondary winding, the voltage detection device configured to detect an AC voltage based on a signal indicating the AC voltage output from the secondary winding of the first transformer by supplying the current converted by the conversion element to the primary winding;
  a current detection unit including a second transformer including a primary winding and a secondary winding, the current detection unit configured to detect a current value of a current supplied to a first load included in the load based on a signal indicating an AC voltage output to a secondary side of the second transformer according to the current by supplying the current to the primary winding;

a zero-crossing detection unit configured to detect a zero-crossing timing of the AC power supply based on a signal indicating the AC voltage detected by the voltage detection device;

a voltage calculation unit configured to calculate a voltage of the AC power supply based on the signal indicating the AC voltage detected by the voltage detection device and the zero-crossing timing of the AC power supply detected by the zero-crossing detection unit;

a power calculation unit configured to calculate an amount of power to be supplied to the first load from the AC power supply based on a value of a current to be supplied to the first load detected based on the signal indicating the AC voltage output from the current detection unit, and a voltage value of the AC voltage calculated by the voltage calculation unit;

a switching unit configured to connect or disconnect a current path from the AC power supply to the primary winding of the first transformer and a power supply configured to output a predetermined DC voltage to a second load included in the load; and a control unit configured to control the switching unit and control power supply to the first load and the second load, and wherein the control unit corrects the amount of power calculated by the power calculation unit based on a first voltage of the AC power supply calculated by the voltage calculation unit when the amount of power is calculated, and a second voltage of the AC power supply calculated by the voltage calculation unit when the switching unit is controlled to start power supply to the power supply and the first transformer from the AC power supply.

8. The image forming apparatus according to claim 7, comprising a driving unit configured to drive the image forming unit and the fixing device for image formation, wherein the first load is the heating resistor member, and the second load is the driving unit.

9. The image forming apparatus according to claim 8, comprising a controller configured to control the image forming unit and the fixing unit, and the control unit is the controller.

10. The image forming apparatus according to claim 9, wherein the fixing device includes a temperature detection unit configured to detect a temperature of the heating resistor member, and the controller starts driving the driving unit to drive the fixing unit when the temperature of the heating resistor member detected by the temperature detection unit is higher than a first temperature.

11. The image forming apparatus according to claim 10, wherein the controller starts image formation by the image forming unit when an amount of power suppliable to the heating resistor member after a lapse of a predetermined period after driving of the driving unit of the fixing unit is started is greater than a predetermined amount of power.

12. The image forming apparatus according to claim 11, wherein the predetermined amount of power is an amount of power for the temperature of the heating resistor member of the fixing unit to reach a temperature appropriate for fixing when the recording material on which the image is formed by the image forming unit having started the image formation has reached the fixing unit.

13. The image forming apparatus according to claim 11, wherein the controller calculates an amount of power suppliable to the heating resistor member based on a corrected amount of the power corrected by the control unit and a power duty used to supply power to the heating resistor member.

14. The image forming apparatus according to claim 12, wherein the controller calculates an amount of power suppliable to the heating resistor member based on a corrected amount of the power corrected by the control unit and a power duty used to supply power to the heating resistor member.

15. The image forming apparatus according to claim 11, wherein the controller starts image information by the image forming unit when the amount of power suppliable to the heating resistor member is equal to or less than the predetermined power amount and the temperature of the heating resistor member detected by the temperature detection unit is higher than a second temperature.

16. The image forming apparatus according to claim 15, wherein the second temperature is a temperature higher than the temperature of the heating resistor member when the amount of power suppliable to the heating resistor member when the predetermined period has elapsed is greater than the predetermined power amount.

17. The image forming apparatus according to claim 9, wherein the controller controls the switching unit to interrupt power supply to the power supply and the first transformer when the image forming apparatus is in a power saving state.

* * * * *